United States Patent [19]

Greatorex

[11] Patent Number: 5,753,001
[45] Date of Patent: May 19, 1998

[54] FILTER UNIT AND PROCESS FOR MANUFACTURING A FILTER UNIT

[75] Inventor: Anthony Thomas Greatorex, Leicester, United Kingdom

[73] Assignee: Texin UK Limited, Leicester, England

[21] Appl. No.: 776,559

[22] PCT Filed: Aug. 2, 1995

[86] PCT No.: PCT/GB95/01825

§ 371 Date: Jan. 30, 1997

§ 102(e) Date: Jan. 30, 1997

[87] PCT Pub. No.: WO96/04976

PCT Pub. Date: Feb. 22, 1996

[30] Foreign Application Priority Data

Aug. 9, 1994 [GB] United Kingdom ............... 9416052

[51] Int. Cl.⁶ ..................................................... B01D 46/02
[52] U.S. Cl. ................................. 55/378; 55/381; 55/382; 55/DIG. 5; 156/204; 156/227; 156/308.4; 156/311
[58] Field of Search ........................ 55/381, 382, 378, 55/374, 341.1, 361, DIG. 5; 156/160, 308.2, 308.4, 311, 226, 227, 204

[56] References Cited

U.S. PATENT DOCUMENTS

| 3,524,304 | 8/1970 | Wittemeier et al. | 55/378 |
|---|---|---|---|
| 3,538,686 | 11/1970 | Schwab | 55/381 |
| 4,105,421 | 8/1978 | Rheinfrank, Jr. et al. | 55/381 |
| 4,304,579 | 12/1981 | Granville et al. | 55/381 |
| 4,344,781 | 8/1982 | Higgins et al. | 55/381 |
| 4,802,900 | 2/1989 | Ball et al. | 55/381 |
| 5,246,474 | 9/1993 | Greatorex | 55/382 |
| 5,643,451 | 7/1997 | Harris et al. | 55/382 |

FOREIGN PATENT DOCUMENTS

| 717742 | 12/1968 | Belgium . | |
|---|---|---|---|
| 529225 | 3/1993 | European Pat. Off. . | |
| 549105 | 6/1993 | European Pat. Off. . | |
| 1271222 | 10/1964 | France . | |
| 2458030 | 6/1976 | Germany . | |
| 2529555 | 9/1976 | Germany | 55/381 |
| 911939.1 | 2/1992 | Germany . | |
| 527228 | 10/1940 | United Kingdom | 55/381 |

*Primary Examiner*—Duane S. Smith

[57] ABSTRACT

A self-supporting filter unit having at least one passage (10) defined by wall portions (12) made from air-permeable fiber fabric, through which wall portions air can pass and be drawn off along the passage but which prevent the passage therethrough of dust and/or other debris carried by such air, in which the passage is closed off at one end portion and at the other end portion there is formed integral with said wall portions a rigid mounting portion (16) into which the passage (10) opens whereby the filter unit can be supported as part of a filter assembly, wherein the mounting portion (16) includes a first reinforcing portion (18) of material around and secured with said fabric of the wall portion parts of the first reinforcing portion and fabric integral therewith remote from said one end being outwardly flanged, and wherein the mounting portion (16) further includes a second reinforcing portion (20,21) of material positioned over the outwardly flanged portions and secured thereto, said second reinforcing portion having an aperture (19,23) formed therein corresponding to the open end of the passage (10).

9 Claims, 3 Drawing Sheets

Fig_1

FILTER UNIT AND PROCESS FOR MANUFACTURING A FILTER UNIT

FIELD OF THE INVENTION

This invention is concerned with a filter unit having at least one passage but preferably a plurality of passages defined by fluid permeable wall portions though which fluid, for example air, to be filtered can pass and be drawn off along the passage or passages but which prevent the passage therethrough of particulate material and/or other debris carried by the fluid. Co-pending European Patent Applications numbers EP0515045A1 and EP0549105A1 are both concerned with such filter units and their manufacture and in particular self-supporting filters units which are particularly suitable for filtering of air in dust filters but may be used for filtering other fluid materials.

BACKGROUND OF THE INVENTION

In the filter units described in EP0515045A1, the passage or passages of the filter units are opened at one end and closed at the other. Mounting means is conveniently provided adjacent the open end of the passages by an outward flange which is formed integral with the wall portions of the passages into which flange the open ends of the passages open. In a preferred filter unit an additional portion of material may be secured to the flange for reinforcing it, this reinforcing material being of the same material as the flange and secured to the flange prior to treatment for rendering the flange rigid. In the aforementioned two European patent specifications, processes are described for forming filter units of various fiber materials and similar processes as described in detail in these two co-pending applications can be used to form filter units in accordance with the present invention.

An alternative example of a prior filter unit is given in DE-2458030. A filter unit is described having reinforcing members at mounting end in order to improve location resiliance of the filter unit in its mounting. These reinforcing members are secured about the open aperture of the filter and are generally rigid elements. Thus, combination of possibly flexible filter material with these rigid elements creates problems with regard to secure location and usually bulk about the filter mounting.

One of the various objects of the present invention is to provide a filter unit having an improved mounting portion.

Another of the various objects of the present invention is to provide an improved process for manufacturing a filter unit with a mounting portion.

SUMMARY OF THE INVENTION

In one aspect, the invention may be considered to provide a filter unit having at least one passage defined by wall portions of air-permeable fiber fabric, said passage being configured to prevent passage of dust and/or debris in a fluid flow drawn therethrough, said passage being closed at one end and at the other end there being an integral filter mounting portion to enable the filter unit to be incorporated in a filter assembly, said mounting portion including a first reinforcing portion arranged and secured about said wall portions of said passage, at least some of said first reinforcing portion and said wall portions secured therewith being arranged to be outwardly flanged to form an outward flange and said mounting portion further includes a second reinforcing portion positioned adjacent said outward flange and bonded thereto, said first and second reinforcing portion having an aperture formed therein to correspond to the open end of the passage.

In another aspect the invention may be considered to provide a process for manufacture of a filter comprising:

(1) forming at least one passage having wall portions from fluid permeable fiber fabric;

(2) closing off an end part of that passage; and characterised in that (3) at an open end of the passage forming a mounting portion by inserting a former member in the passage, positioning a first reinforcing fiber fabric layer around said open portion such that at least parts of the first reinforcing fiber layer and the wall portions extend beyond the first presser means, pressing the first reinforcing fiber layer against said wall portions extending beyond the first presser means to bend said first reinforcing layer and said portions extending beyond the first presser means outwardly, positioning a second reinforcing layer in alignment and adjacent with the bent outwardly projecting parts of said portions and said first reinforcing layer, pressing said second reinforcing layer against said part of said first reinforcing layer and said portions to form a consolidated outwardly flanged portion and treating said portions and said first and second reinforcing layers to secure them together and rigidise them to provide a mounting portion for the filter.

A preferred filter unit in accordance with the invention has a plurality of passages defined by wall portions made from a rigid corrugated air permeable fiber fabric, secured along the peaks of the corrugations, the secured reinforcing portion having an aperture or apertures therein corresponding with the open ends of the passages.

In preferred filter units the first and second reinforcing portions each comprise non-woven fiber fabrics but these are not necessarily the same fabrics although they may be in some instances, and nor are they necessarily the same as the fiber fabric of the wall portions. Indeed, in most filters, the properties required for the first and second reinforcing portions are such that the composition of these fiber fabrics should preferably be different from that of the wall portions.

Conveniently the second reinforcing portion comprises a first reinforcing layer and a second layer by which the first layer is bonded to the outwardly flanged portion; where the mounting portions are consolidated and rigidified by heating, in carrying out a process in accordance with the invention, this second layer conveniently comprises heat softenable fibers with a softening point lower than the bulk of the fibers of the first reinforcing layer or of the wall portions, although this second layer may include some fibers of a higher melting point to provide additional strength and/or to facilitate manufacture.

Conveniently a process in accordance with the invention is used in forming a filter unit in accordance with the invention.

The second reinforcing portion may conveniently comprise at least one further reinforcing layer bonded to the first reinforcing layer.

Preferably a filter unit in accordance with the invention also comprises a strengthening portion adjacent said one closed end portion of the passage, the strengthening portion being provided by forming parts of the wall portions. The strengthening portion may, for example, have the shape of an inverted V with the apex pointing toward the open end portion of the passage, or an inverted T, or be generally L-shaped. Preferably the strengthening portion additionally comprises a third reinforcing portion secured to the formed parts of the wall portions.

There now follows a detailed description, to be read with reference to the accompanying drawings, of two filter units and a process of manufacturing the filter units, embodying the invention.

In the accompanying drawings:

DESCRIPTION OF THE DRAWING

In the accompanying drawings like reference characters indicate like parts.

DESCRIPTION OF THE INVENTION

Figure 1:
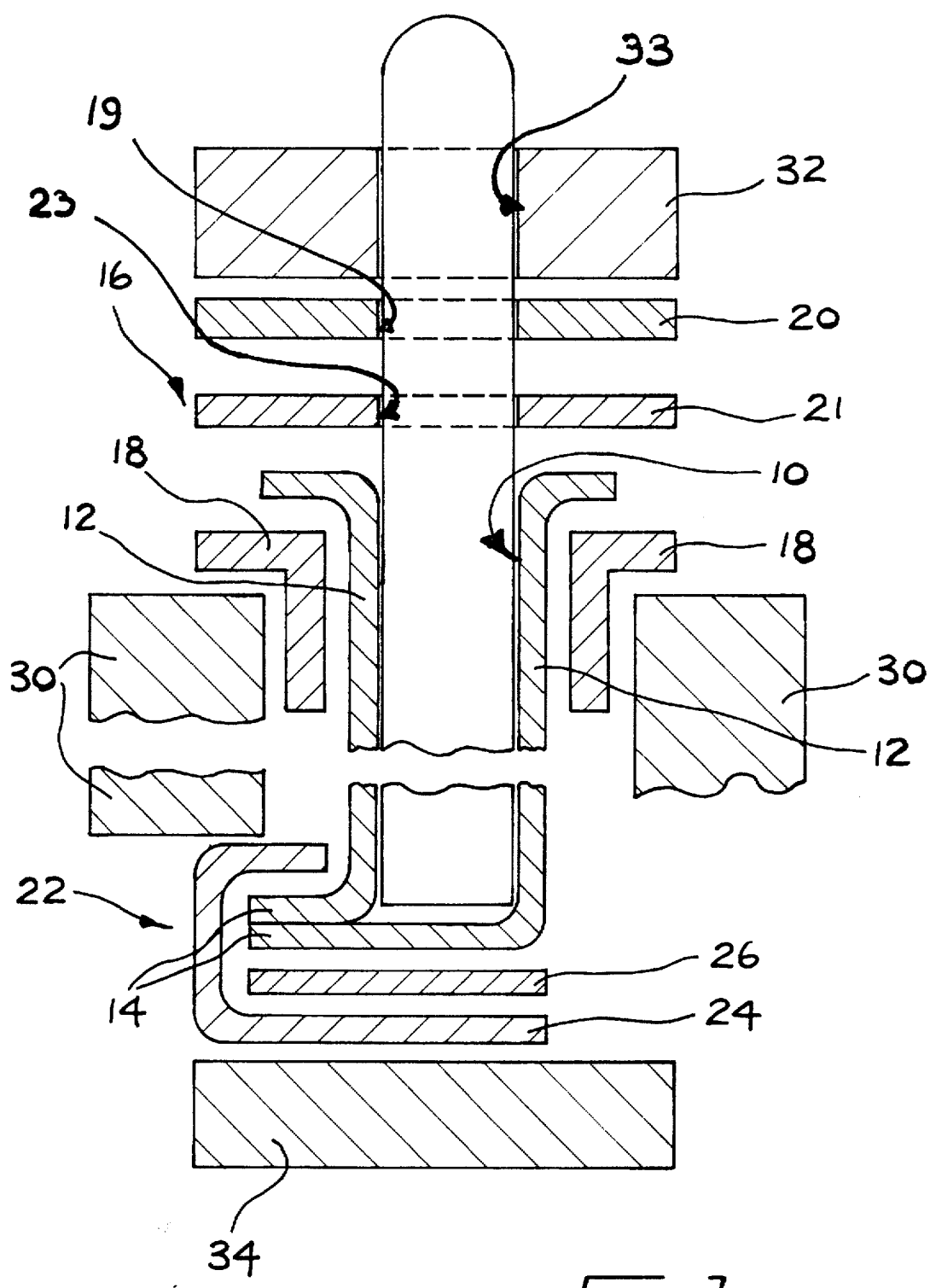
FIG. 1 is a diagrammatic exploded view in section showing a first illustrative filter unit and apparatus used in its manufacture.

A self-supporting filter unit is shown in FIG. 1 having a plurality of passages (10) defined by wall portions (12) made from air permeable non-woven fiber fabric through which wall portions (12) air can pass and be drawn off along passages (10) but which prevent the passage therethrough of particulate material e.g. dust, and/or other debris carried by such air. The passages (10) are closed off at one end portion by securing together extremities (14) of the fabric. At the other, open end portion there is formed integral with the wall portions (12) a rigid mounting portion (generally designated 16) into which the passages (10) open whereby the illustrative filter unit can be supported as part of a filter assembly.

The mounting portion (16) comprises a first reinforcing portion (18) of non-woven fiber fabric material which extends around and is secured to the fabric of the wall portions (12), parts of the first reinforcing portion (18) and of the fabric of the wall portion being outwardly flanged. The mounting portion further comprises a second reinforcing portion (20,21) of non-woven fiber fabric material positioned over the outwardly flanged portions, in alignment therewith, and secured thereto, the second reinforcing portion (20,21) having one or more apertures (19,23) therein corresponding to the open end of the passage (10).

Adjacent said closed one end of the passages (10) a strengthening portion, (generally designated 22) is provided by forming parts of the wall portions, including the extremities (14). This strengthening portion (22) is generally L-shaped and comprises fabric of the wall portions (12) including the extremities (14) and a third reinforcing portion (24) which is secured by means of a bonding material (26) to the fabric of the wall portions (12). The third reinforcing portion (24) is wrapped around the extremities (14) of the wall portions (12).

The second reinforcing portion (20,21) comprises a first reinforcing layer (20) and a second layer (21) by which the first layer is bonded to the outwardly flanged portion but which may, itself, comprise an amount of reinforcing fiber as well as a bonding agent, if desired.

The first and second illustrative filter units can be made by any convenient process for example as described in either one of the co-pending patent applications mentioned above.

Figure 3:
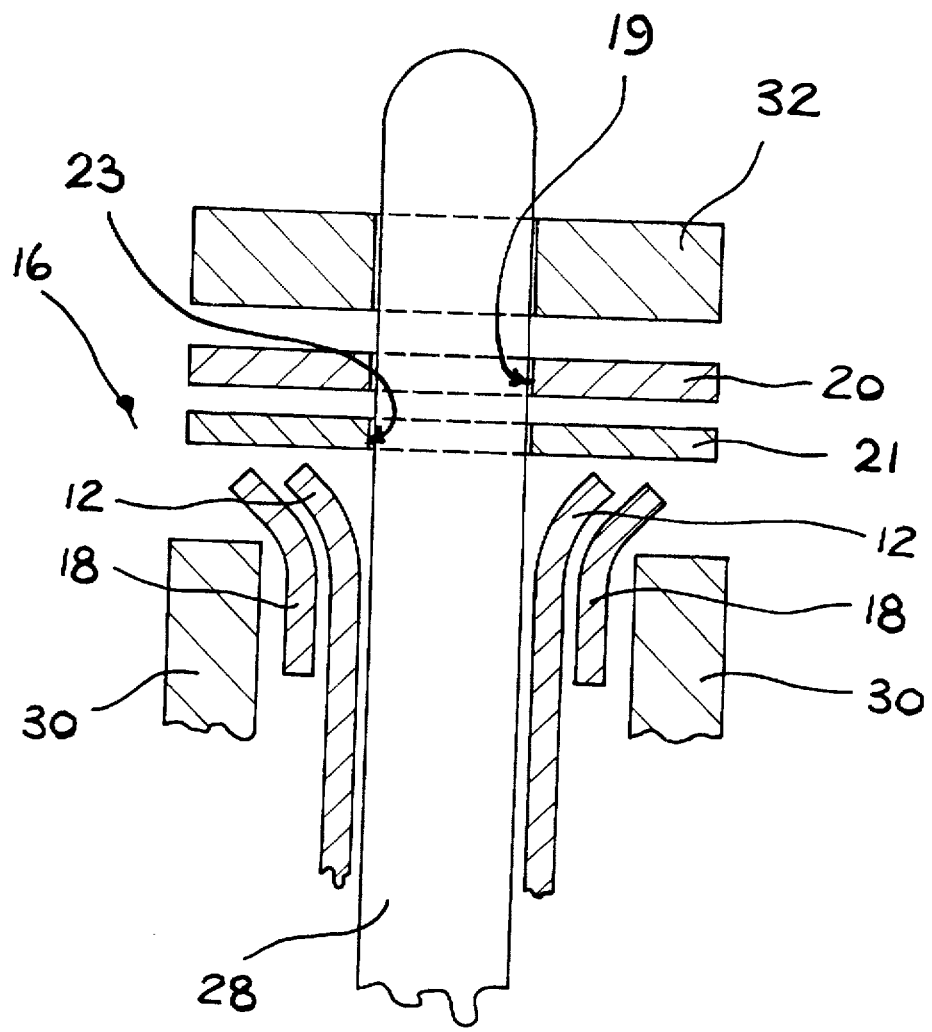
FIG. 3 is a diagrammatic view showing the manufacture of the first illustrative filter unit partially complete.

A general process for manufacturing the mounting and strengthening portions of the first illustrative filter unit is, however, described with reference to FIGS. 1 and 3 of the accompanying drawings.

The process described with reference to FIG. 1 involves forming a fluid permeable fiber fabric to provide the wall portions (12) for example as described in either of the above mentioned co-pending patent applications and forming the mounting portion (16) at the other end of the filter unit, namely the open end. The passages (10) have formers (28) inserted into them, the formers having a shape corresponding to the cross sectional shape to be imparted to the passages. Parts of the fabric of the wall portions (12) project beyond first presser means (30) positioned outwardly of the former (28). A strip (18) of suitable fiber fabric is then positioned round the wall portions (12) adjacent the open end of the passages (10) such that part of this strip of fabric (18) projects, partially, beyond the presser means (30) and overlies the projecting parts of the fabric of the wall portions (12). Thereafter, part of the fabric layer (18) is pressed by the first presser means (30) against the wall portion (12) supported by the former (28), thereby causing the parts of the layer (18) and wall portion (12) projecting beyond the presser means (30) to flare outwardly as shown in FIG. 3. The first reinforcing layer (20) and the second layer (21) of the second reinforcing portion are then slid onto the former (28) using the apertures to locate the layers (20,21) correctly, positioned adjacent the flared projecting end of the layer (18) and wall portions (12) and pressed against the first presser means (30) by second presser means (32) (which is provided with an aperture (33) through which the former passes) whereby to form the outwardly flanged portion (16). The wall portions (12) and the first and second reinforcing portions (18,20) are thus then treated to secure them together and render them rigid thus to provide the mounting portion. In carrying out the illustrative process the various fabrics are heat activated and the presser members supply heat as well as pressure to the various fabrics whereby to bond the portions together by heat and pressure thus consolidating the first and second reinforcing portions (18,20) and the wall portion (12) adjacent the open portions of the passages (30) thus to form a mounting portion integral with the wall portions (12). The portions (18) and (12) are consolidated (where not outwardly flanged) to the same thickness as the remainder of the wall portion (12) of the illustrative filter units.

The strengthening portion adjacent the closed end of the passages (10) is also formed in a somewhat similar manner insofar as the extreme end portions (14) of the wall portions (12) project beyond the presser means (30) and, as shown in FIG. 1 are deflected to provide a general L-shaped configuration. The third reinforcing portion (24) is positioned in alignment with the projecting portion including the extremities (14) with a bonding layer (26) interposed between part of the third reinforcing portion (24) and the extremities (14) of the wall portion and the third reinforcing portion is then wrapped around the extremities (14) as shown in FIG. 1.

Finally the second reinforcing portion is pressed by third presser means (34) against end faces of the formers (28) and against the presser means 30 to activate the bonding layer (26) and the third reinforcing portion (24), to cause the third reinforcing portion to bond securely to the fabric of the wall portions.

In carrying out this illustrative process the various fabrics are treated by heat and pressure both to effect bonding and to render them sufficiently rigid to provide the strengthening portion (22). To effect satisfactory bonding both the first reinforcing portion (18) and the third reinforcing portion preferably contain a proportion of fibers which are activated by heat and pressure to assist bonding, if necessary.

Figure 2:
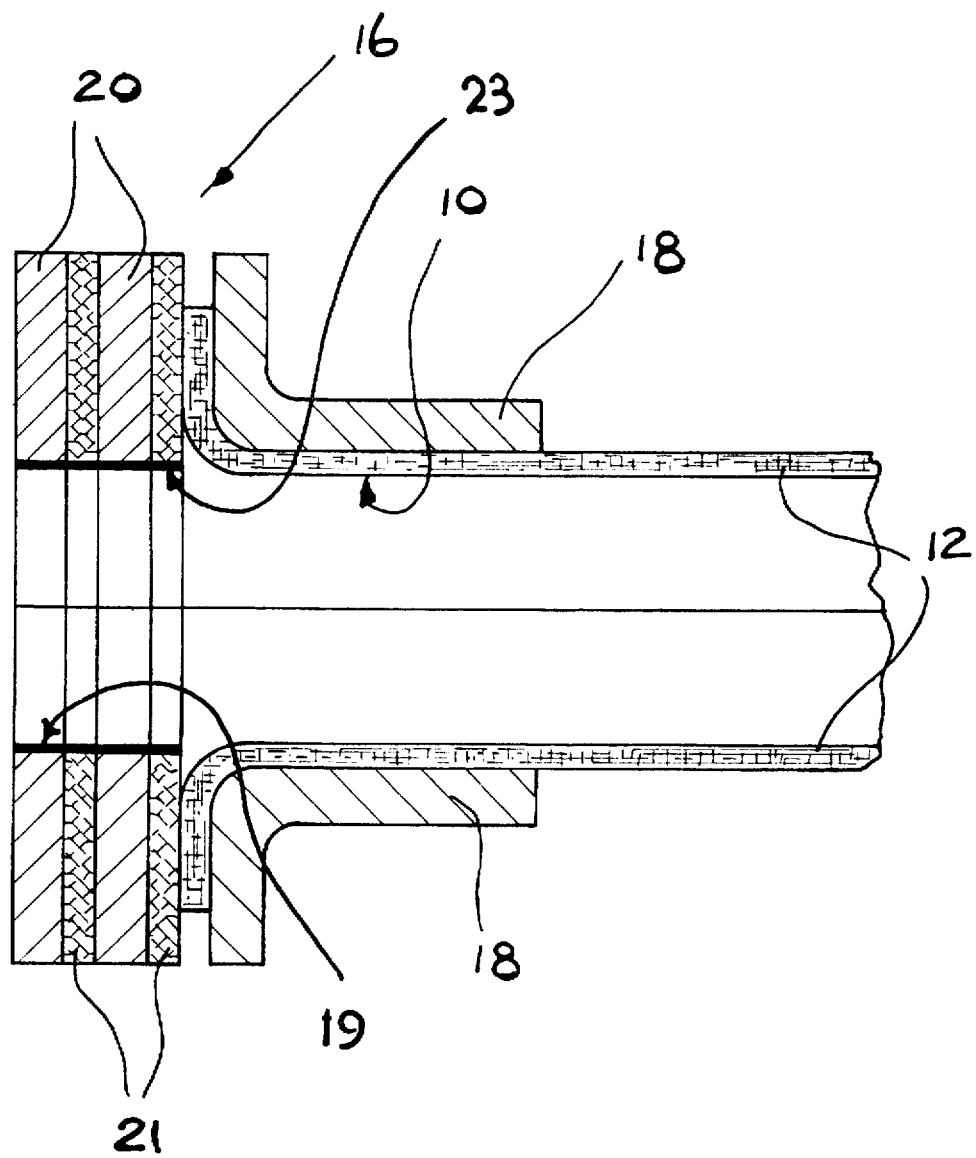
FIG. 2 is a diagrammatic view of a second illustrative filter unit.

The second illustrative filter is shown in FIG. 2 and is generally similar in construction to the first illustrative filter unit except that the second reinforcing portion comprises two reinforcing layers (20) and two bonding layers (21), one of the bonding layers bonding an adjacent first reinforcing layer (20) to the outwardly flanged part of the mounting means 16 and the other of the second layers being sandwiched between the two first reinforcing layers whereby to adhere them to one another. The second illustrative filter unit is made in a similar way to the first unit.

When the illustrative filter units are complete, the mounting portions (16) are integral with the wall portions (12) and provide firm and rigid support for the wall portions (12) of the filter unit.

The first reinforcing portion (18) is especially useful in giving good support to the wall portions (12) when the illustrative filter units are positioned in a filter assembly with the passages (10) extending horizontally as shown in FIG. 2. Furthermore, the strengthening portion (22) is sufficiently rigid to prevent undue flexing of the ends of the filter unit remote from the mounting portions (16).

The wall portions (12) and various reinforcing portions are preferably made of suitable fiber fabric materials and are selected according to the use to which the filter unit is to be put.

To illustrate the invention further by way of example, three examples of filter units in accordance with the invention are described hereinafter as Examples 1–3. However, it will be understood that fiber fabric as discussed in the co-pending patent applications mentioned above and as described in the examples thereof may be used in the manufacture of filter units in accordance with the present invention. Reference is directed to the above mentioned co-pending applications for further information relating to manufacturing techniques and materials suitable for use in the manufacture of filter units in accordance with the present invention.

EXAMPLE 1

The first example will be described with reference to the first illustrative filter unit shown in FIGS. 1 and 3.

In carrying out this example, the wall portion is a polyester fiber fabric.

The first reinforcing portion (18) is a blend consisting of one part by weight of Grilene K-170 (RTM) co-polyester melt-bonding fiber having a melting point of about 179° C. (DSC test), and two parts by weight of a polyester fiber having a melting point of about 240° C., that is higher than the K-170 fibre. Grilene K-170 (RTM) is available from EMS—Grilonsa, CH-7013 Domat/Ems. The fabric used in forming the first reinforcing portion (18) has a weight of 500 gsm. The second reinforcing portion comprises a first reinforcing layer (20) of pre-shrunk polyester fiber fabric having a weight of 1200 gsm (the melting point of the polyester being about 240° C.) and the second layer (21) is a polypropylene fiber fabric having a weight of 500 gsm, the polypropylene having a softening point of about 165° C., that is lower than the polyester. The fabric of the third reinforcing portion (24) is the same as that of the first reinforcing portion (18) and the layer (26) is a polypropylene fabric layer identical with the composition of the layer (21).

The blend of standard polyester fiber and Grilene K-170 (RTM) co-polyester melt-bonding fiber is used to counter any embrittlement effects which may arise from exposure of the polypropylene bonding layer to prolonged high temperatures.

The strengthening portion 22 is intended not only to resist bending under load of the filter unit but also to minimise the possibility of end blow-out of the filter unit.

EXAMPLE 2

Example 2 is described with reference to FIG. 2 of the accompanying drawings and again in this example the body of the filter, namely the wall portions (12) comprise a polyester fiber fabric. Polyester filter bodies are generally suitable for use in circumstances where the filter units will not be exposed to temperatures in excess of about 120° C. The fabric used in making the first reinforcing portion (18) is the same as used in Example 1, namely a blend of one part by weight Grilene K-170 (RTM) and two parts by weight of polyester fiber, the portion having a weight of 500 gsm and being needled.

The first reinforcing layer (20) of the second reinforcing portion is also a polyester fiber, fabric which is a blend of different polyester fibers and which has a thickness of 3 mm and is pre-shrunk at 245° C. for about 7 minutes to a weight of about 750 gsm. The blend is of one third by weight 1.7 decitex fibers about 40 mm length, one third by weight 3.3 decitex fibers about 50 mm in length and one third by weight 5.0 decitex fibers about 60 mm in length. The second layer (21) of said portion is a polypropylene non-woven fiber fabric defined as being about 6.7 dtex. The polypropylene has a softening point of about 165° C. The weight of the second layer (21) is about 500 gsm.

EXAMPLE 3

In example 3, the fabric of the wall portions of (12) of the filter is a needled felt comprising copolyimide fibers having a glass transition temperature of 315° C. supplied under the designation P84 by Lenzing AG.

In the third example reference is made to FIG. 2. The first reinforcing portion (18) comprises a blend of one part by weight Ryton fibers and about two parts by weight Nomex (RTM) fibers, the first reinforcing portion having a weight of about 300 gsm. Ryton (RTM) fibers are polyphenylene sulphide resin fibers having a melting point of about 285° C. manufactured by Phillips Fibres Corporation and available from them. The Ryton (RTM) fibres are suitable for use in filter assemblies operating at continuous temperatures of 180° C. Nomex (RTM) are aramid fibers. Nomex (RTM) is heat resistant and has good dimensional stability at relatively high temperatures. Nomex (RTM) does not melt but degrades rapidly at temperatures above about 370° C. It is suitable for use at continuous temperatures up to about 260° C. Both Ryton (RTM) and Nomex (RTM) are relatively inert to most solvents but Ryton (RTM) fibers have a softening point so that they afford a heat-bonding capability in admixture with Nomex fibers, whilst still providing good heat resistance in normal conditions of use.

The first reinforcing layer (20) of the second reinforcing portion is provided by a non-woven fiber fabric blend similar to the fabric of the first reinforcing portion (18) but having a weight of 600 gsm.

The second layer (21) is a non-woven fiber fabric layer consisting of a blend of four parts by weight of Ryton fibers and one part by weight Nomex fibers. The weight of the fabric of the layer (21) is 300 gsm.

In each of these various Examples whilst the non-woven fibre fabric of the first layer or layers (20), together with the first reinforcing portion (18), provide a substantial part of the strength and rigidity of the mounting portion, the layer or layers (21), consisting of a greater proportion of lower softening point material serve to bond the components together but also provide some stiffness to the finished mounting portion.

The layer of fabric (18) used in forming the first reinforcing portion is typically about 25 mm in width whilst the filter units from the mounting portion (16) to the strengthening portion (20) are typically about 1.5 meters in length.

The reinforcing portions (18,20) provide a strong mounting portion (16) by which the filter units can be firmly supported even when positioned with the passages (10) lying with their axes horizontal.

I claim:

1. A filter unit having at least one passage (10) defined by wall portions (12) of air-permeable fiber fabric, said passage (10) being configured to prevent passage of dust or debris in a fluid flow drawn therethrough, said passage (10) being closed at one end (14) and at the other end there being an integral filter mounting portion (16) to enable the filter unit to be incorporated in a filter assembly, said mounting portion (16) including a first reinforcing portion (18) arranged and secured about said wall portions (12) of said passage (10), at least some of said first reinforcing portion (18) and said wall portions (12) secured therewith being arranged to be outwardly flanged to form an outward flange and said mounting portion further includes a second reinforcing portion (20,21) positioned adjacent said outward flange and bonded thereto, said first (18) and second reinforcing portion (20,21) having an aperture (19;23) formed therein to correspond to the open end of the passage (10) characterized in that said wall portions (12), said first reinforcing portion (18) and said second reinforcing portion (20,21) are integrally bonded and that said first (18) and said second reinforcing portion (20,21) comprise rigidized non-woven fiber fabric, the second reinforcing portion (18) is positioned adjacent the outward flange on the side of the aperture such that the flanged part of the wall portion (12) is between the first (18) and second reinforcing portions (20,21).

2. A filter unit according to claim 1 wherein the unit has a plurality of passages (10) defined by rigid corrugated wall portions (12), secured together along the peaks of the corrugations, and wherein the second reinforcing portion (20,21) has apertures (19;23) therein corresponding with respective open ends of the passages (10).

3. A filter unit according to claim 1 wherein the wall portions (12) comprise polyester fiber fabric, the first reinforcing portion (18) is a non-woven fabric which comprises a blend of about two parts by weight of fibers of a first component comprising polyester and about one part by weight of a second component, comprising melt bonding fibers, having a lower softening point than the first component, and a first layer of the second reinforcing portion (20,21) is a polyester fiber non-woven fabric bonded to the outward flange portion by a second layer which is a polypropylene non-woven fiber fabric.

4. A filter unit according to claim 1 wherein the wall portions (12) comprise a fiber fabric comprising polyimide, the first reinforcing portion (18) is a non-woven fabric which comprises a blend of about two parts by weight of fibers of a first component, comprising aramid fibres and about one part by weight of fibres of a second component, comprising polyphenylene sulphide fibers, having a lower melting point than the first component, and a first layer of the second reinforcing portion (20,21) is a blend of fibers identical with the first reinforcing portion bonded to the outwardly flanged portion by a second layer which is a non-woven fabric consisting of a blend of about four parts by weight polyphenylene sulphide fibers to one part by weight aramid fibers.

5. A filter unit according to claim 1 comprising a strengthening portion (22) at said one closed end portion (14) of the filter unit, the strengthening portion (22) being provided by forming parts of the wall portions (12).

6. A filter unit according to claim 5 wherein the strengthening portion (22) is generally L-shaped, V-shaped or T-shaped.

7. A filter unit according to claim 6 wherein the strengthening portion (22) comprises a third reinforcing portion (24) secured to the formed parts of the wall portions (12).

8. A process for manufacture of a filter comprising:

(1) forming at least one passage (10) having wall portions (12) from fluid permeable fiber fabric;

(2) closing off an end part (14) of that passage; and characterized in that (3) at an open end of the passage (10) forming a mounting portion (16) by inserting a former member (28) in the passage (10), positioning a first reinforcing fiber fabric layer (18) around said open portion such that at least parts of the first reinforcing fiber layer (18) and the wall portions (12) extend beyond a first presser means (30), pressing the first reinforcing fiber layer (18) against said wall portions (12) extending beyond the first presser means (28) to bend said first reinforcing layer (18) and said portions (12) extending beyond the first presser means outwardly, positioning a second reinforcing layer (20,21) in alignment and adjacent with the bent outwardly projecting parts of said portions (12) and said first reinforcing layer (18), pressing said second reinforcing layer (20,21) against said part of said first reinforcing layer (18) and said portions (12) to form a consolidated outwardly flanged portion and treating said portions (12) and said first (18) and second reinforcing layers (20,21) to secure them together and rigidize them to provide a mounting portion (16) for the filter.

9. A process as claimed in claim 8 wherein heat and pressure are used to secure and render rigid the filter components.

* * * * *